United States Patent
Chareire et al.

[11] Patent Number: 5,405,560
[45] Date of Patent: Apr. 11, 1995

[54] PROCESS FOR THE PRODUCTION OF A PART, PARTICULARLY A CARBON-CARBON BRAKE DISK AND TO THE PART OBTAINED

[75] Inventors: Jean-Louis Chareire, Levallois; Jean Salem, Taverny, both of France

[73] Assignee: Societe Nationale Industrielle et Aerospatiale, Paris Cedex, France

[21] Appl. No.: 911,365

[22] Filed: Jul. 13, 1992

Related U.S. Application Data

[63] Continuation of Ser. No. 825,319, Jan. 27, 1992, abandoned, which is a continuation of Ser. No. 458,740, Dec. 6, 1989, abandoned.

[30] Foreign Application Priority Data

Jun. 18, 1987 [FR] France .................. 87 08518

[51] Int. Cl.⁶ .................. C01B 31/00; B32B 31/18
[52] U.S. Cl. .................. 264/29.5; 423/447.4; 428/408
[58] Field of Search .................. 264/29.1, 29.5, 29.6, 264/60; 428/408; 423/447.1, 447.4

[56] References Cited

U.S. PATENT DOCUMENTS

| | | | |
|---|---|---|---|
| 3,734,797 | 5/1973 | Byers | 428/66 |
| 3,914,508 | 10/1975 | Hooton et al. | 428/480 |
| 3,970,174 | 7/1976 | Kirkhart | 264/29.5 |
| 3,991,248 | 11/1976 | Bauer | 428/408 |
| 4,297,307 | 10/1981 | Taylor | 264/29.5 |
| 4,318,955 | 3/1982 | Kulakov et al. | |
| 4,341,830 | 7/1982 | Betts et al. | 264/29.5 |
| 4,457,967 | 7/1984 | Chareire et al. | 428/212 |
| 4,490,201 | 12/1984 | Leeds | 264/29.5 |
| 4,629,644 | 12/1986 | Matuska | 428/408 |

FOREIGN PATENT DOCUMENTS

| | | |
|---|---|---|
| 2065134 | 7/1971 | France . |
| 2144329 | 2/1973 | France . |
| 1549687 | 8/1979 | United Kingdom . |
| 2028230 | 3/1980 | United Kingdom . |

*Primary Examiner*—Mathieu D. Vargot
*Attorney, Agent, or Firm*—Oblon, Spivak, McClelland, Maier & Neustadt

[57] ABSTRACT

In a process for manufacturing a carbon-carbon component, in particular a brake disk, a porous substrate in the shape of a brake disk (32) is formed exclusively from carbon fibres. Holes (34), whose axes are parallel to the axis of rotation (36) of the disk, are made in the substrate and are arranged on concentric circles (38) centered on said axis of rotation. Areas (42) free of holes are provided around keyways (40) in the disk. The substrate is then compregnated by CVD. The holes in the substrate reduce the path of the gas in the substrate.

12 Claims, 2 Drawing Sheets

PROCESS FOR THE PRODUCTION OF A PART, PARTICULARLY A CARBON-CARBON BRAKE DISK AND TO THE PART OBTAINED

This application is a Continuation of application Ser. No. 07/825,319, filed on Jan. 27, 1992, which was a continuation application of U.S. Ser. No. 07/458,740, filed on Dec. 6, 1989, now both abandoned.

BACKGROUND OF THE INVENTION

1. Field of the Invention

The present invention relates to a process for the production of a composite material part of the carbon-carbon type, as well as to the parts obtained by this process. In particular, these parts are brake disks intended for use on land vehicles, aircraft, or space vehicles (rockets or shuttles). More specifically, the invention is applicable to all types of parts in which carbon-carbon plays a structural part.

2. Description of the Background

A composite material of the carbon-carbon type is a material formed from a substrate of carbon reinforcing fibres, embedded in a graphite or carbon matrix.

These composite materials are obtained by densification of a porous substrate consisting either of impregnating the structure to be densified with a liquid hydrocarbon or a resin and then pyrolyzing the hydrocarbon or resin so as to obtain a coke matrix, or placing the substrate to be densified raised to an adequate temperature in a carbon-containing gas flow in order to thermally decompose said gas into pyrolyric graphite or carbon, which can then be deposited within the substrate.

Unfortunately, these densification processes are relatively long and therefore expensive. In connection with the vapour phase process (CVPD), this is linked with the difficulty of being able to make the gas to be pyrolyzed penetrate the interior of the porous substrate, said difficulty increasing with the thickness of the part. In addition, the lower the poroursity of the substrate, the more difficult it is to achieve the penetration of the carbon-containing gas. This penetration difficulty of the gas to be pyrolyzed leads to parts having a relatively ununiform density.

For the liquid impregnation method, the length of the process is due to the need to recommence the impregnation cycle several times.

The porous substrate to be densified is produced by unidirectional or multi-directional weaving, the holes possibly formed during weaving or needle felting serving solely for the passage of the carbon reinforcing fibres of the composite material.

Moreover, it is known that brake disks produced from a homogeneous material, generally metal, have a plurality of hies oriented in accordance with the axis of revolution of the disk in order to aid braking under trickling water and cooling in general. These holes are obtained by drilling the disk following the production of the latter.

FR-A-2,144,329 in particular teaches the drilling of holes in a brake blank, following densification by immersion in a liquid resin, with a view to evacuating the gases formed during the carbonization of the resin. The sole function of these holes is then that of vents, which have long been known in conventional foundry methods.

GB-A-2 028 230 also teaches the drilling of holes in already densified fibre layers, with a view to the introduction of other fibres into them.

SUMMARY OF THE INVENTION

The present invention relates to a process for the production of a composite material part having a densification stage which is easier to perform than that of the prior art processes.

It relates to the production of holes in the fibrous substrate of a composite part prior to any densification. These holes are not obtained by drilling after the production of the final material and they are also not intended for the passage of fibres which seal them.

DETAILED DESCRIPTION OF THE INVENTION

Figure 4:
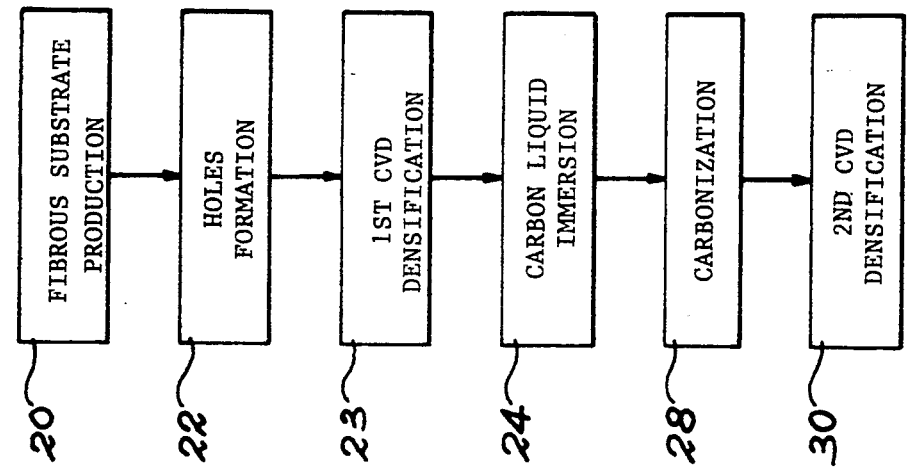
FIG. 4 illustrates a third embodiment of the present process.

More specifically, the invention relates to a process for the production of a composite material part formed from carbon reinforcing fibres embedded in a carbon matrix, characterized in that it comprises:
  a) forming a porous substrate exclusively constituted by carbon-containing fibres,
  b) forming in the porous substrate issuing holes, whose axes are perpendicular to the wall of the substrate with the largest surface and
  c) densifying the porous substrate by thermal decomposition of a hydrocarbon gas flow in order to form the carbon matrix by depositing pyrolytic graphite or carbon in the pores of the substrate, the holes made in the substrate and which remain serve to reduce the paths of the gas in the substrate.

The term reinforcing fibre is understood to mean any long or short, braided or unbraided filament, generally used in the field of composite materials. The term fibrous substrate is understood to mean a plurality of bare fibres, not impregnated with resin and not densified, made from carbon or carbon precursors.

The essential point of the holes according to the invention is to reduce the length of the paths of the gas to be pyrolyzed in the fine porousities of the substrate during densification. Thus, it is vital that at least part of said active gas reaches the least accessible areas of the substrate without being decomposed on the hot walls which they meet. Thus, cracking tends to occur from the first contact of the molecules with a hot wall. However, if the aim is solely to evacuate the passive gases formed during the pyrolysis of a resin, as in FR-A-2 144 329, no importance is attached to the length of such paths. All that is then important is the presence of a gas leak, because the latter does not react with the walls of the part.

Thus, the holes according to the invention ensure an identical access to all the porous substrate layers, so that there is a uniformity of the composite material part and a considerable reduction in the gaseous phase densification. Moreover, the duration of densification becomes quasi-independent of the thickness of the part. Thus, the penetration of the gas into the complete porous substrate takes place not only through the outer surfaces of the substrate, but particularly by the walls of the holes.

Finally, these holes constitute a stopping point for the propagation of cracks in the part obtained, thus increasing the shock resistance thereof.

The hydrocarbon gas is formed by a gaseous hydrocarbon or a mixture of gaseous hydrocarbons. These hydrocarbons are saturated or unsaturated, substituted or unsubstituted hydrocarbons having in particular 1 to 4 carbon atoms, such as methane, ethane, propane and butane.

The process of the invention is applicable to all possible porous substrate types (cloths, felts, etc), provided that they do not reach a value which is too close to the maximum theoretical density of carbon fibres in the porous substrate not provided with the holes.

Thus, the process according to the invention is applicable to random mats which may or may not be needle felted, to wicks of randomly disclosed multiple filaments, to unidirectional layers, to stacked cloths, etc.

For such porous substrate types, the holes are formed by the displacement or the spacing apart of the fibres of the substrate, without cutting the same, e.g. by inserting in individual or collective manner perfectly smooth and tapered needles, which only cause very limited damage to the fibres which they meet during their passages of the substrate.

In the case of very dense porous substrates (particularly three-dimensional weaving), the process according to the invention can also apply, provided that empty holes are provided, i.e. not intended for the introduction of fibres, during the weaving of the porous substrate.

One of the essential features of the process according to the invention is that the various perforated, porous substrates retain the memory of the holes made, following the production of the carbon matrix, or at least after the first phases of producing said matrix.

As a function of the drilling or perforating process used, the holes created are not always in an identical form. Thus, certain substrates having short fibres have a tendency to partly reseal the holes formed giving a fluffy appearance to the walls of said holes. Thus, light cannot pass through the composite part via the holes, but the latter appear very clearly in their original form in X-ray radiography. Such fluffy holes are just as effective for the passage of carbon-containing gases and therefore for speeding up densification as holes with smooth walls.

The holes made in the grouped, long fibre substrates, such as wicks and cloths, do not allways have fluffy walls, but can also be light-tight, whilst retaining their original form in X-radiography.

In order to obtain holes with more clearly defined edges and having in particular smooth and regular walls, it is possible to place in each of the holes made in the substrate rods of materials which cannot be carburized at the temperatures in question and in particular of copper or molybdenum. These rods can be introduced either during possible heat treatments of the substrate, which has not yet been densified and serving to improve the characteristics of the substrate, or if the latter is initially in the form of a carbon precursor, or alternatively at the start of densification of the substrate by CVD. The densification of the substrate by CVD obviously continues in the absence of such rods.

As a function of the nature of the porosity of the substrate, it is possible to make the substrate undergo a preimpregnation in a carbon-containing liquid bath, e.g. in a liquid hydrocarbon and to follow said impregnation by draining with a view to removing the liquid present in the holes. A carbonization of the assembly then makes it possible to form a porous coke matrix. The material obtained can then undergo densification by the gaseous route, without having lost the gas access facilities within the porous material, which is not the case with the prior art processes.

On completing the gaseous internal densification of the material, a voluntary modification to the physical conditions of cracking the carbon-containing gas can lead to the formation of a pyrolytic graphite or carbon crust on the outer surfaces of the composite material part, as well as on the walls of the holes in order to partly or totally seal them. In this case, the diameter of the holes can have initially have been made sufficiently small with a view to said automatic sealing at the end of densification. These voluntary modifications in particular consist of increasing the temperature or pressure of the gas.

In mechanics, a hole is in general terms a manner of stopping the propagation of cracks in the materials. Within the scope of the invention, these holes are particularly effective because their walls are maximum matrix density zones, which makes them particularly resistant and strong. Moreover, the fibres are not cut and merely surround the holes. For certain composite materials parts, it may be necessary to completely seal the holes formed in the porous substrate.

In this case, the final sealing of the holes, i.e. after vapour phase densification, can consist of immersing the densified material in a carbon-containing liquid bath e.g. constituted by pyrolyzable resin, or filled or unfilled liquid hydrocarbon, followed by the carbonization of the assembly in order to obtain a coke, which may possibly serve as a support during a final densification by hydrocarbon gas thermal decomposition.

It is also possible to seal the holes with a more widely used and less costly material than carbon, which may be suitable for rubbing or friction, such as certain metals or ceramic-metal mixtures. A possible material is copper and all products commercially used in brake blocks.

It is also possible to use materials having an antioxidizing power for the carbon, such as tricalcium phosphates as the material for sealing the holes. Obviously, this sealing of the holes by a non-carbon-containing material must be carried out after the densification of the composite material in the gaseous phase.

The invention also relates to composite material parts formed from carbon-containing reinforcing fibres embedded in a carbon-containing matrix obtained by the process according to the invention. These parts have holes, whose axes are perpendicular to the wall of the part with the largest surface.

As a function of the process used, the holes can have smooth or regular walls, or can have fluffy walls. Moreover, these holes can be sealed by one of the non-carbon-containing materials described hereinbefore. In this case, the initial existence of the holes can be revealed by X-ray radiography and in particular by optical micrography.

In particular, these composite materials parts are brake disks. In this case, the holes are oriented parallel to the axis of revolution of the brake disk. When these holes are not completely sealed during densification, they make it possible to increase the efficiency of braking on a wet road by improving the response time of the brakes, due to the penetration of the water into the holes.

The effectiveness of these holes during the production of composite material parts is dependent on a number of factors, including the distance between the holes and their diameter, or the total perimeter of the walls of the holes per surface unit of the composite material part.

In the case of an aircraft brake disk, in a manner not limiting the invention the diameter of the holes is 0.5 to 5 mm and their spacing 3 to 30 mm.

These holes can be distributed in a random or non-random manner. With regards to the friction, the holes can have a random distribution, when they are sealed at the end of the densification of the brake disk. Conversely, when the holes are not sealed, the minimum wear to the brake disks is obtained when the holes are disposed on concentric circles centred on the axis of revolution of the disk, so that the brake disk retains an adequate surface proportion to be able to rub circumferentially without any discontinuity.

Figure 3:
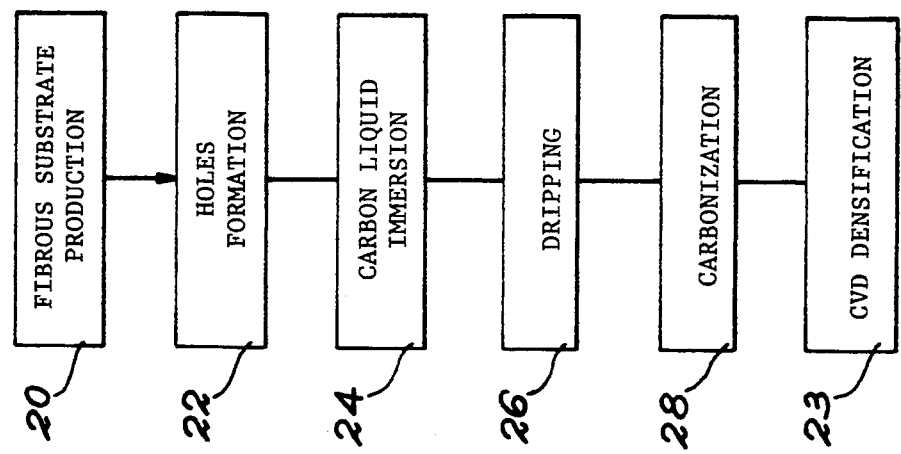
FIG. 3 illustrates a second embodiment of the present process.
Figure 1:
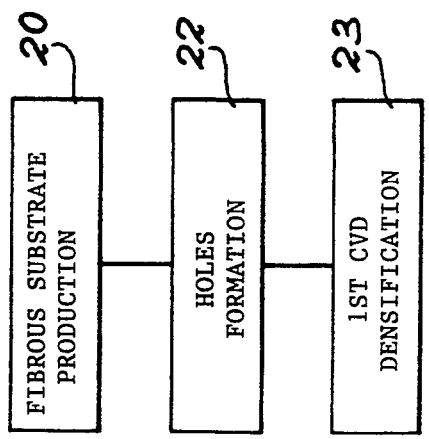
FIG. 1 illustrates and embodiment of the present process.

The invention is described in greater detail hereinafter relative to non-limitative embodiments and the attached drawings, wherein show:

FIGS. 1, 3 and 4 diagrams illustrating embodiments of the process for producing a composite material part according to the invention.

Figure 2:
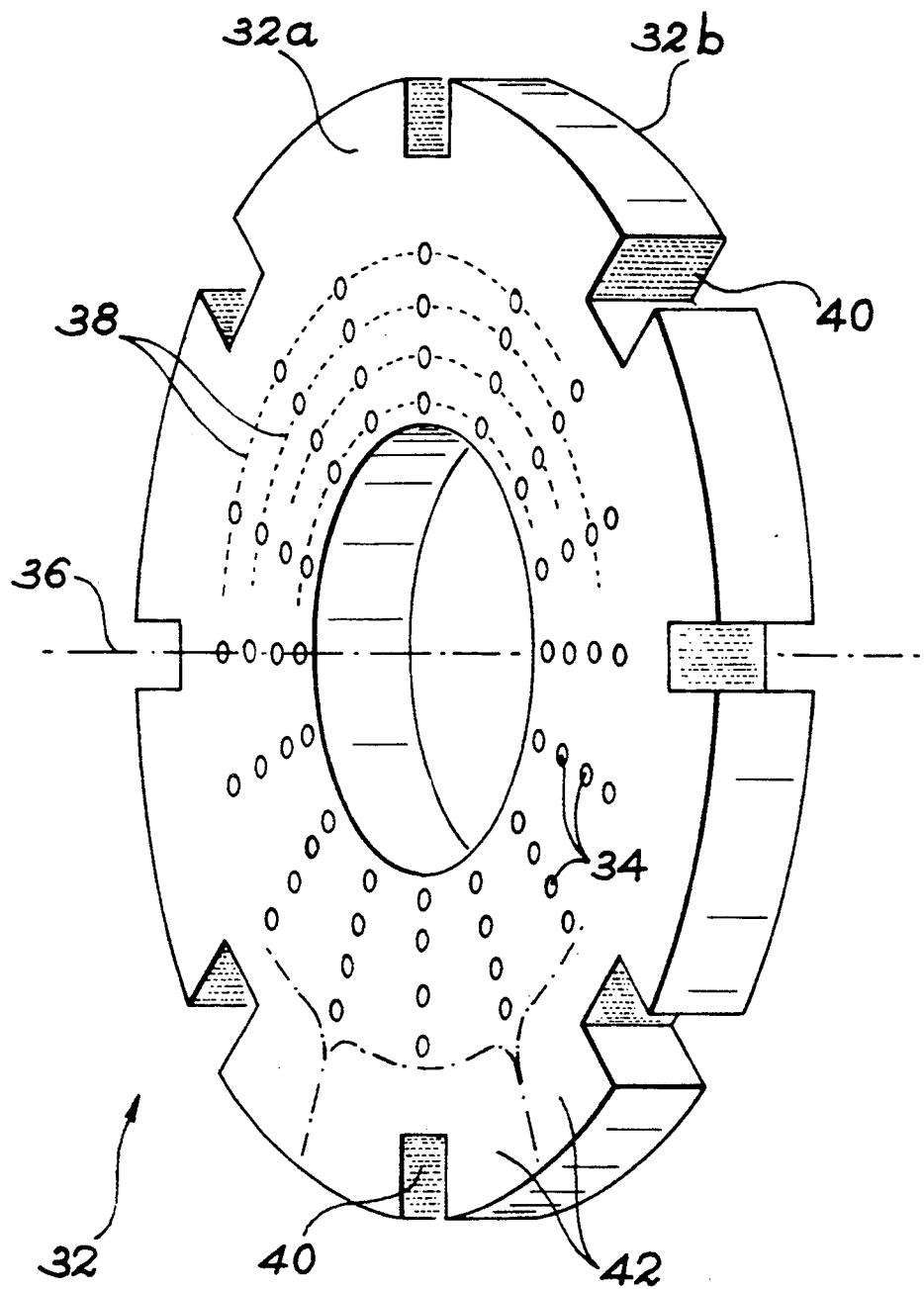
FIG. 2 illustrates a brake disk obtained by the present process.

FIG. 2 diagrammatically and in perspective, a brake disk obtained by the process according to the invention.

EXAMPLE 1

With reference to FIG. 1, a description will now be given of the preferred embodiment of a brake disk according to the invention.

The first stage of the process, as represented by block 20, consists of forming a carbon porous fibrous substrate, arranging bear carbon fibres (non-impregnated or non-densified) in n directions of the same plane and in known manner. The form of the substrate is in particular that of a brake disk.

The second stage of the process, represented by block 22, consists of forming holes in the fibrous substrate and having a diameter of 0.5 to 5 mm, by inserting metal needles, which are perfectly smooth and tapered, in order to displace the fibres without destroying them. The density of the holes is 1 per $cm^2$.

As represented by block 23, the following stage of the process consists of depositing in the porous substrate pyrolyric carbon, by chemical vapour phase deposition (CVD) using methane. Chemical decomposition is performed in a furnace kept at around 1000° C. for approximately 150 hours, the gas being circulated under a pressure of 500 to 3000 Pa.

This single densification stage gives a density of 1.8 for a 20 mm thick brake disk.

The prior art CVD densification requires 600 hours for a brake disk with the same dimensions.

Machining the densified substrate gives it its final form.

This process makes it possible to obtain a brake disk as shown in FIG. 2 and which is constituted by a carbon-carbon mechanical structure 32 provided with unsealed holes 34 and whereof the axes are oriented parallel to the axis of revolution 36 of the disk and therefore perpendicular to the surfaces 32a, 32b of the disk with the largest surface. These holes 34 issue on either side 32a,32b of the disk. In addition, they are located on concentric circles 38 centred on the axis of revolution 36.

EXAMPLE 2

In Example 2, the stages identical in all respects to those of Example 1 are represented in FIG. 3 by a block with the same references. Example 2 demonstrates the affectiveness of the process according to the invention. Thus, it is possible to use a densification by liquid impregnation of the porous substrate prior to vapour phase densification, with an efficiency well above that conventionally obtained with an unperforated substrate.

To this end, immersion takes place of the fibrous substrate provided with its holes and in accordance with Example 1, in a liquid hydrocarbon, such as a coal tar, as indicated by block 24 in FIG. 3. The substrate is then allowed to drip in the open air, as indicated by block 26, so as not to seal the holes 34 in FIG. 2 during the following carbonization stage.

This stage consists of placing the impregnated substrate in a furnace raised to approximately 700° C., in order to transform the liquid hydrocarbon present in the holes and in the porousities of the substrate into pyrolytic graphite or carbon. This stage is represented by block 28. In this example, the holes in the brake disk are only partly sealed.

EXAMPLE 3

FIG. 4 shows an embodiment of the inventive process making it possible to obtain carbon-carbon parts, whereof the holes according to the invention are sealed at the end of densification.

The stages of this embodiment are identical in all respects to those described hereinbefore, such as the production of the fibrous substrates, the formation of the holes, the first densification by CVD, the immersion in a liquid hydrocarbon and Carbonization and are represented by a block having the same references.

This embodiment differs from that of Example 2 by carrying out a second densification stage, indicated at 30, by chemical vapour phase deposition of pyrolytic graphite or carbon just after the carbonization 28 of the liquid hydrocarbon. This final densification is performed by methane cracking in a furnace heated to 1000° C. for 10 to 20 hours.

In addition, there is no dripping or draining stage between the immersion 24 in the liquid hydrocarbon and the carbonization, which contributes to the sealing of the holes.

The above description has been given in a solely illustrative manner and modifications are possible without passing beyond the scope of the invention. For example, it is possible to precede the first densification 23 by CVD in Example 3 by immersion in a liquid hydrocarbon, followed by draining and carbonization, as described in Example 2.

We claim:

1. A process for the production of a composite material part formed from carbon reinforcing fibers embedded in a carbon matrix, which comprises:
    a) forming a non-densified porous substrate exclusively constituted by carbon-containing fibers, which are oriented randomly;
    b) forming in the porous substrate obtained in step a) issuing holes by inserting needles which are smooth and tapered, in order to displace said fibers without destroying them, said issuing holes having axes which are perpendicular to the wall of the substrate with a larger surface; and c) densifying the porous substrate by thermal decomposition of a hydrocarbon gas flow in order to form the carbon matrix by depositing pyrolytic graphite or carbon in the pores of the substrate, the holes remaining in the substrate after densification, thereby ensuring that at least part of said gas flow reaches the least accessible areas of the substrate.

2. The process according to claim 1, wherein said porous substrate is a cloth or felt material or wicks of random multiple filaments.

3. The process according to claim 1, wherein the holes are formed by spacing apart the fibers of the substrate.

4. The process according to claim 1, wherein said holes formed have a diameter of 0.5 to 5 mm with a spacing of 3 to 30 mm, and are distributed in a non-random or random manner.

5. The process according to claim 1, wherein the holes formed have a density of 1 per $cm^2$.

6. The process according to claim 1, wherein said needles are made of metal.

7. The process according to claim 1, wherein said porous substrate is a brake disk.

8. The process according to claim 7, which is used to produce a brake disk constituted by a carbon-carbon mechanical structure provided with unsealed holes which axes are oriented parallel to the axis of revolution of the disk and perpendicular to the surfaces of the disk with the largest surface, said holes issuing on either side of the disk and being located on concentric circles centered on the axis of revolution.

9. The process according to claim 1, wherein said deposition of pyrolytic graphite or carbon is effected at a temperature of about 1,000° C. for about 150 hours.

10. The process according to claim 1, wherein between stages b) and c), the porous substrate is immersed in a carbon-containing liquid bath, followed by draining and carbonization of the assembly which does not seal the holes.

11. The process according to claim 10, wherein said carbon-containing bath comprises coal tar.

12. The process according to claim 10, wherein said draining comprises dripping in air.

* * * * *

UNITED STATES PATENT AND TRADEMARK OFFICE
CERTIFICATE OF CORRECTION

PATENT NO. : 5,405,560
DATED : April 11, 1995
INVENTOR(S) : Jean-Louis CHAREIRE, et al.

It is certified that error appears in the above-indentified patent and that said Letters Patent is hereby corrected as shown below:

On the title page, Item [30], the PCT information has been omitted from the Foreign Application Priority Data. It should read:

--Jun. 16, 1988 [PCT] PCT.....PCT/FR88/00317--

Signed and Sealed this

Twentieth Day of June, 1995

Attest:

BRUCE LEHMAN

Attesting Officer

Commissioner of Patents and Trademarks